United States Patent [19]

Park

[11] Patent Number: 5,743,824
[45] Date of Patent: Apr. 28, 1998

[54] AUTOMATIC TRANSMISSION WITH IMPROVED POWER TRAIN

[75] Inventor: Lae-Kyoung Park, Yongin-Gun, Rep. of Korea

[73] Assignee: Hyundai Motor Company, Rep. of Korea

[21] Appl. No.: 765,936

[22] PCT Filed: Jul. 15, 1994

[86] PCT No.: PCT/KR94/00092

§ 371 Date: Apr. 11, 1997

§ 102(e) Date: Apr. 11, 1997

[87] PCT Pub. No.: WO96/02771

PCT Pub. Date: Feb. 1, 1996

[51] Int. Cl.$^6$ ............................................. F16H 3/64
[52] U.S. Cl. ............................................. 475/276
[58] Field of Search ............................... 475/200, 204, 475/276

[56] References Cited

U.S. PATENT DOCUMENTS

| | | |
|---|---|---|
| 4,916,980 | 4/1990 | Asada et al. |
| 5,030,187 | 7/1991 | Asada . |
| 5,057,063 | 10/1991 | Asada et al. |
| 5,059,162 | 10/1991 | Otsuka . |
| 5,090,952 | 2/1992 | Asada . |
| 5,203,749 | 4/1993 | Ito . |
| 5,584,775 | 12/1996 | Miura et al. ............... 475/200 |
| 5,643,130 | 7/1997 | Park ............... 475/276 |
| 5,667,451 | 9/1997 | Park ............... 475/276 |

*Primary Examiner*—Dirk Wright
*Attorney, Agent, or Firm*—Finnegan, Henderson, Farabow, Garrett & Dunner, L.L.P.

[57] ABSTRACT

A transmission for a motor vehicle having a gear train capable of establishing five forward and one reverse drive ratios. The gear train includes 3 planetary gear sets, 2 of which are mounted on an input shaft and the third is mounted on an output shaft disposed parallel to the input shaft. There is a drive connection between the two shafts through the gear trains. Speeds 1 through 4 and reverse are established in the first 2 gear sets on the input shaft. A fifth speed is established by the third gear set on the output shaft. Each sun gear of the first 2 gear sets is clutched to the input shaft. The sun gear of the third gear set is clutched to the chive connection. The annulus of the first gear set is rigidly connected to the planet carrier of the second gear set. The annulus of the second gear set is rigidly connected to the planet carrier of the first gear set.

12 Claims, 2 Drawing Sheets

FIG. 2

| | | B1 | B2 | B3 | B4 | F1 | F2 | F3 | F4 | C1 | C2 | C3 | C4 | C5 | ENGINE BRAKE |
|---|---|---|---|---|---|---|---|---|---|---|---|---|---|---|---|
| P | | | | | | | | | | | | | | | |
| R | | ○ | | | | ○ | | ○ | | | | | ○ | ○ | YES |
| N | | | | | | | | | | | | | | | |
| D | 1 | | | | | ○ | ○ | | ○ | | ○ | | | ○ | NO |
| D | 2 | | ○ | | | ○ | | ○ | ○ | | ○ | | | ○ | NO |
| D | 3 | | ○ | | | ○ | | | ○ | | ○ | ○ | | ○ | NO |
| D | 4 | | ○ | ○ | | | | | ○ | | ○ | ○ | | ○ | YES |
| D | 5 | | ○ | ○ | ○ | | | | | | ○ | ○ | | | YES |
| 4 | 1 | | | | | ○ | ○ | | ○ | | ○ | | | ○ | NO |
| 4 | 2 | | ○ | | | ○ | | ○ | ○ | | ○ | | | ○ | NO |
| 4 | 3 | | ○ | | | ○ | | | ○ | | ○ | ○ | | ○ | NO |
| 4 | 4 | | ○ | ○ | | | | | ○ | | ○ | ○ | | ○ | YES |
| 3 | 1 | | | | | ○ | ○ | | | ○ | ○ | ○ | | ○ | NO |
| 3 | 2 | | ○ | | | ○ | | ○ | | ○ | ○ | ○ | | ○ | NO |
| 3 | 3 | | ○ | | | ○ | | | | ○ | ○ | ○ | ○ | ○ | YES |
| 2 | 1 | ○ | | | | ○ | ○ | | | ○ | ○ | ○ | | ○ | YES |
| 2 | 2 | | ○ | ○ | | ○ | | ○ | | ○ | ○ | ○ | | ○ | YES |
| 1 | | | ○ | | ○ | ○ | ○ | | | ○ | ○ | ○ | | ○ | YES |

AUTOMATIC TRANSMISSION WITH IMPROVED POWER TRAIN

FIELD OF THE INVENTION

The present invention is directed to an automatic transmission for use in an automobile; and, more particularly, to a power train of the type which comprises first and second planetary gear sets arranged along a first transmission shaft for providing first to fourth forward drive ratios and one reverse drive ratio and a third planetary gear set disposed on a second transmission shaft for accomplishing a fifth forward drive ratio, wherein the first and second planetary gear sets are operatively coupled to the third planetary gear set through the use of a chain and sprocket coupler.

DESCRIPTION OF THE PRIOR ART

As is well-known in the art, the drivability or fuel efficiency of a motor vehicle can be heavily affected by the characteristics of its transmission, especially in case of an automatic power transmission. Hence, a variety of automatic transmissions have been developed in an effort to improve the drivability or fuel economy of the automotive vehicle. Conventionally, the automatic transmission includes a power or gear train having at least two simple planetary gear sets whose rotary movement is under close control of hydraulically operated clutches and brakes. As used herein, the term power train is interchangeable with the gear train. Similarly, the terms planet gear and pinion gear, and the terms annulus gear and ring gear are used synonymously. A hydraulic control system is employed to have the clutches and the brakes selectively engaged or released, thereby controlling the rotary movement of the planetary gear set in such a manner to provide a desired drive ratio.

Since the advent of the automatic transmission, a great deal of efforts has been made to provide a compact, reliable and cost-effective gear train which satisfies various operating requirements. Recent trend has been to equip the automatic transmission with a gear train capable of providing five or more forward drive ratios and at least one reverse drive ratio. For instance, U.S. Pat. No. 5,030,187 issued to Asada on Jul. 9, 1991 discloses an automatic transmission having a gear train which comprises first, second and third single-pinion planetary gear sets. The ring gear of the first single-pinion planetary gear set is connected integrally or selectively to the carrier of the second single-pinion planetary gear set. The carrier of the first single-pinion planetary gear set is connected integrally or selectively to the carrier of the third single-pinion planetary gear set; and the sun gear of the second single-pinion planetary gear set is connected integrally or selectively to the sun gear of the third single-pinion planetary gear set. The automatic transmission disclosed in the above patent is capable of operating in any one of at least five forward gears and one reverse gear.

Another type of automatic transmission is shown in U.S. Pat. No. 5,057,063 issued to Asada et al. on Oct. 15, 1991 wherein a gear train for changing the rotational speed of an input shaft consists of first and second single pinion type planetary gear sets and a third double pinion type planetary gear set. A sun gear of the first planetary gear set is normally or selectively connected to a carrier and a sun gear of the second planetary gear set; a carrier of the first planetary gear set is normally or selectively connected to a carrier of the third planetary gear set; the carrier of the second planetary gear set is normally or selectively connected to a sun gear of the third planetary gear set; a ring gear of the second planetary gear set is normally or selectively connected to a ring gear of the third planetary gear set; the input shaft is selectively connected to either one or both of the sun and the ring gears of the first planetary gear set; and the output shaft is connected to the sun gear of the third planetary gear set, whereby at least five forward speeds and one reverse speed are established.

U.S. Pat. No. 5,090,952 issued to Asada on Feb. 25, 1992 teaches a gear train for changing the rotational speed of an input shaft that consists of first and third single pinion type planetary gear sets and a second double pinion type planetary gear set. Ring gears of these three planetary gear sets are normally or selectively interconnected to each other; a carrier of the first planetary gear set is normally or selectively connected to a sun gear of the third planetary gear set; a sun gear of the first planetary gear set is normally or selectively connected to a sun gear of the second planetary gear set; and the sun gear of the second planetary gear set is normally or selectively connected to the carrier of the first planetary gear set, whereby at least five forward speeds and one reverse speed become available.

While the prior art automatic transmission systems referred to above have been offered, needs have continued to exist for an improved automatic transmission having a gear train which further enhances the vehicle drivability, fuel economy, adaptability, structural integrity and like characteristics.

SUMMARY OF THE INVENTION

Accordingly, it is a primary object of the present invention to provide an automatic transmission for a motor vehicle which substantially eliminates various drawbacks inherent in a conventional automatic transmission and significantly improves the performance characteristics of the vehicle.

In order to achieve the above object, in one aspect of the present invention, there is provided an automatic transmission for a motor vehicle having a gear train capable of establishing five forward and one reverse drive ratios, the transmission comprising:

(a) an input shaft; (b) a first planetary gear set concentrically mounted about the input shaft for rotary movement therewith, the first planetary gear set including a first sun gear selectively connectable to the input shaft, a first annulus gear and a first planetary carrier rotatably supporting pinion gears thereon; (c) a second planetary gear set concentrically mounted on the input shaft in an axially spaced relationship with respect to the first planetary gear set, the second planetary gear set including a second sun gear selectively connectable to the input shaft, a second annulus gear rigidly coupled to the first planetary carrier and a second planetary carrier selectively connected to the input shaft and rigidly connected to the first annulus gear, said second carrier rotatably supporting second pinion gears thereon; (d) an output shaft extending in a spaced, parallel relationship with respect to the input shaft; and (e) a third planetary gear set concentrically mounted about the output shaft and drivingly coupled to both of the first planetary carrier and the second annulus gear, said third planetary gear set including a third sun gear, a third annulus gear and a third planetary carrier rotatably supporting third pinion gears thereon, wherein the first and the second planetary gear sets serve to provide first to fourth forward drive ratios and one reverse drive ratio, the third planetary gear set being operable to establish a fifth forward drive ratio.

BRIEF DESCRIPTION OF THE DRAWINGS

The above and other objects and features of the present invention will become apparent from the following description of preferred embodiments given in conjunction with the accompanying drawings, in which:

FIG. 2 is a table illustrating the operation sequence of clutches and brakes employed in the gear train shown in FIG. 1.

DETAILED DESCRIPTION OF THE PREFERRED EMBODIMENTS

Figure 1:
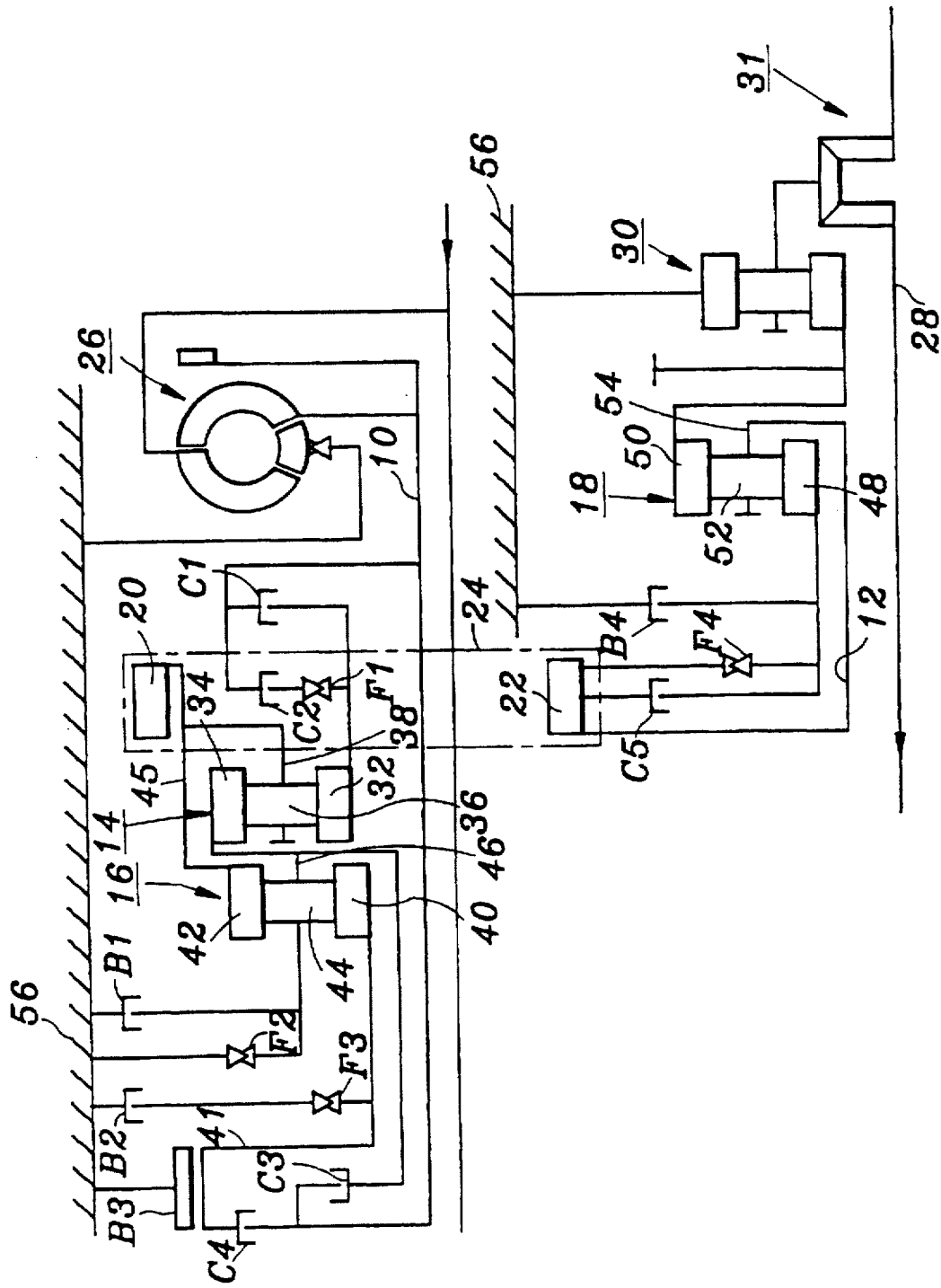
FIG. 1 is a schematic representation of an automatic transmission gear train in accordance with the instant invention.

The automatic transmission gear train, schematically shown in FIG. 1, comprises an input shaft 10, an output shaft 12 extending in a parallel relationship with respect to the input shaft 10, a first simple planetary gear set 14, a second simple planetary gear set 16 and a third simple planetary gear set 18. The first and second planetary gear sets 14, 16 are rotatably mounted on the input shaft 10 in an axially spaced relationship to one another so as to establish, independently of the third planetary gear set 18, first to fourth forward drive gear ratios and one reverse drive gear ratio. The third planetary gear set 18 is rotatably mounted on the output shaft 12 to provide a fifth forward drive gear ratio. To achieve the fifth forward drive ratio, the third planetary gear set 18 is made operable to further increase the output speed of the first and second planetary gear sets 14, 16 when they are operating at the fourth drive ratio.

For the very reason that the first and second planetary gear sets 14, 16 are associated with the first to the fourth forward drive ratios and the reverse drive ratio, the third planetary gear set 18 having relation to the fifth forward drive ratio alone, the first and second gear sets 14, 16 are often referred to as a "main transmission portion", as distinguished from an "auxiliary transmission portion" designating the third gear set 18.

In the preferred embodiment, the first and second planetary gear sets 14, 16 are drivingly coupled to the third planetary gear set 18 through the use of, e.g., a pair of drive and driven sprockets 20, 22 and an endless chain 24 wound therearound. As may be apparent to an ordinary skilled person, the input shaft 10 is connected to a torque converter or fluid coupling 26 which, in turn, is operatively coupled to an engine(not shown for the sake of simplicity). The output shaft 12 is drivingly connected to the third planetary gear set 18 which supplies its output to a vehicle axle 28 via a final reduction gear arrangement 30 and a differential gear 31 to thereby provide a rotary drive force for the vehicle. The final reduction gear arrangement 30 is preferably in the form of a fourth simple planetary gear set whose reduction ratio is kept constant, although other reduction devices than shown in FIG. 1 may equally be adopted for the final speed reduction purpose.

The first planetary gear set 14, concentrically mounted about the input shaft 10 for rotary movement therewith, includes a first sun gear 32 selectively connectable to the input shaft 10, a first annulus or ring gear 34, a plurality of first planet or pinion gears 36 circumferentially disposed between the sun gear 32 and the annulus gear 34 and a first planetary carrier 38 designed to rotatably support the pinion gears 36.

The second planetary gear set 16, concentrically mounted about the input shaft 10 in an axially spaced relationship with respect to the first planetary gear set 14, includes a second sun gear 40 selectively couplable to the input shaft 10, a second annulus or ring gear 42 rigidly connected to the first planetary carrier 38 for rotation therewith as a unit, a plurality of second planet or pinion gears 44 circumferentially disposed between the sun gear 40 and the annulus gear 42 and a second planetary carrier 46 rotatably supporting the pinion gears 44. It should be appreciated that the second planetary carrier 46 is rigidly connected to the first annulus gear 34 for rotation therewith in unison and is selectively couplable to the input shaft 10.

In the illustrated embodiment, the first planetary carrier 38 and the second annulus gear 42 are both connected to the drive sprocket 20 through a rotating drum 45. As set forth hereinbelow in detail, the first and second planetary gear sets coact with each other to establish first to fourth forward drive ratios and one reverse drive ratio.

Turning to the third planetary gear set 18, it is adapted to be rotatably driven by means of the driven sprocket 22 which receives rotary power from the drive sprocket 20. The third planetary gear set 18, concentrically mounted about the output shaft 12, includes a third sun gear 48 selectively connectable to the rotating drum 45 of the first planetary carrier 38 and the second annulus gear 32 via the sprockets 20, 22 and the endless chain 24. A third annulus gear 50 is coaxially disposed about the third sun gear 48 so that it can transmit the output of the third planetary gear set 18 to the final reduction gear arrangement 30. Circumferentially provided between the third sun gear 48 and the third annulus gear 50 are a plurality of, e.g., three, third pinion gears 52, each rotatably supported by a third planetary carrier 54. At all times, the third planetary carrier 54 remains drivingly coupled to the rotating drum 45 of the first planetary carrier 38 and the second annulus gear 42 with the aid of the sprockets 20, 22 and the endless chain 24.

The final reduction gear arrangement 30 serves to further reduce the rotational speed of the third annulus gear 50 operatively connected thereto, thereby producing an increased torque to be delivered to the known differential gear 31. It suffices to say that the final reduction gear arrangement 30 is intended to simply increase the torque at the final stage of the power transmission and is operable at a constant reduction ratio.

As can be seen in FIGS. 1 and 2, the first to third planetary gear sets 14, 16, 18 are adapted to establish first to fifth forward drive ratios and one reverse drive ratio one at a time in correspondence to the selective engagement or release of various clutches and brakes. The clutches may preferably comprise hydraulically actuated multi-disc clutches and self-lockable oneway clutches, each designed to rotate along with the moving parts of the gear train. In contrast, the brakes may be either hydraulically actuated multi-disc brakes or drum-type brakes which are fixedly mounted to a transmission casing and, therefore, remain stationary at all times.

Referring again to FIG. 1, a first multi-disc clutch C1 is disposed between the input shaft 10 and the first sun gear 32 and is selectively operable to connect the first sun gear 32 to the input shaft 10. In a similar manner, a second multi-disc clutch C2 and a first oneway clutch F1 are serially disposed between the input shaft 10 and the first sun gear 32 in a parallel relationship with respect to the first clutch C1. Providing the second clutch C2 and the first oneway clutch F1 in addition to the first clutch C1 makes it possible to prevent reverse delivery of the rotational power from the first sun gear 32 to the input shaft 10 when such need arises.

A third multi-disc clutch C3 is positioned between the input shaft 10 and the second planetary carrier 46 to selectively connect them for rotation as a unit. A fourth multi-disc clutch C4 functions to selectively couple the input shaft 10 and the second sun gear 40. As illustrated in the lower part of FIG. 1, a fifth multi-disc clutch C5 is utilized to selectively connect the third sun gear 48 to the driven sprocket 22.

Disposed in parallel between a transmission casing 56 and the second planetary carrier 46 are a first multi-disc brake B1 which is selectively operable to connect the second planetary carrier 46 to the stationary portion of the transmission casing 56 and a second oneway clutch F2 which serves to prevent counterclockwise rotation of the second planetary carrier 46. A second multi-disc brake B2 and a third oneway clutch F3 are serially arranged between the transmission casing 56 and the second sun gear 40 to ensure that, as the second brake B2 comes into engagement, the third oneway clutch F3 prevent the second sun gear 40 from any counterclockwise rotation. A third drum-type brake B3 is provided between the transmission casing 56 and a hub 41 of the second sun gear 40 to selectively hold the second sun gear 40 against any clockwise or counterclockwise rotation.

It can be further appreciated that a fourth multi-disc brake B4 is disposed between the transmission casing 56 and the third sun gear 48 and that a fourth oneway clutch F4 lies between the driven sprocket 22 and the third sun gear 48 in a parallel relationship with respect to the fourth brake B4 and the fifth multi-disc clutch C5. The fourth brake B4 is selectively operable to connect the third sun gear 48 to the transmission casing 56, whereas the fourth oneway clutch F4 makes it sure that the torque be reversely transmitted from the third sun gear 48 to the driven sprocket 22 even though the fifth clutch C5 is in a released condition.

Operation of the instant gear train will now be set forth in the following with reference to FIGS. 1 and 2. For the sake of convenience and with a view to avoiding redundancies, the following description is focused on the first to the fifth forward drive speeds in "D" range and one reverse drive speed. As used herein, the term "clockwise" or "counterclockwise" is intended to mean the direction of rotation of the gear train components as seen from the right-hand side of FIG. 1

First Forward Drive Ratio

As is apparent from the table of FIG. 2 identifying the engaged or locked clutches and brakes in small circles, the first forward drive ratio of "D" range is established by way of engaging the second multi-disc clutch C2 and the fifth multi-disc clutch C5 and causing the first, second and fourth oneway clutches F1, F2, F4 to be locked. The input from the input shaft 10 will cause the first sun gear 32 to rotate clockwise, which, in turn, leads to a counterclockwise rotation of the first pinion gears 36. Due to the fact that the first annulus gear 34 remains immovable by the second oneway clutch F2, the first planetary carrier 38 is caused to rotate in the clockwise direction at a first, lowest speed.

Such rotation of the first carrier 38 is transmitted to the third planetary carrier 54 via the drive sprocket 20, the endless chain 24 and the driven sprocket 22. Since the third sun gear 48 is rigidly connected to the driven sprocket 22 by virtue of the fifth multi-disc clutch C5, the third carrier 54 cannot be subjected to any relative movement with respect to the third sun gear 48. This results in a unitary rotation of the third planetary gear set 18 as a whole, thus providing the first forward drive ratio with no engine brake or hill brake effect. The "engine brake effect" per se is widely known in the art and will be briefly explained below in connection with the fourth forward drive ratio.

Second Forward Drive Ratio

The second forward drive ratio is accomplished by way of further engaging the second multi-disc brake B2 under the first speed condition and causing the third oneway clutch F3 to be locked with the second oneway clutch F2 brought into a free-wheeling state. As in the first speed set forth above the input from the input shaft 10 will cause the first sun gear 32 to rotate clockwise, which, in turn, leads to a counterclockwise rotation of the first pinion gears 36.

Because of the second sun gear 40 being kept stationary by means of the second brake B2 and the third oneway clutch F3, the first annulus gear 34 and, hence, the second planetary carrier 46 are subjected to a rotational movement in the clockwise direction, thus giving the second annulus gear 42 a tendency to rotate counterclockwise. As a result, the second annulus gear 42 will reduce the torque of the first planetary carrier 38, which means that the drive sprocket 20 is rotatably driven clockwise at a second, somewhat increased rotational speed as compared with the first forward drive ratio.

The clockwise rotation of the sprocket 20 is transmitted to the third planetary carrier 54 with the aid of the endless chain 24 and the driven sprocket 22. As the third sun gear 48 is rigidly connected to the driven sprocket 22 by means of the fifth multi-disc clutch C5, the third carrier 54 cannot be subjected to any relative movement with respect to the third sun gear 48. This results in a unitary rotation of the third planetary gear set 18 as a whole, thus providing the second forward drive ratio with no engine brake effect.

Third Forward Drive Ratio

The third forward drive ratio is attained by way of further engaging the third multi-disc clutch C3 under the second speed condition and allowing the third oneway clutch F3 to come into a free-wheeling state. The input of the input shaft 10 is delivered to the second planetary carrier 46 and the first annulus gear 34 via the third multi-disc clutch C3 as well as to the first sun gear 32 via the second multi-disc clutch C2. At this moment, the third oneway clutch F3 remains unlocked and therefore serves as a free-wheeler. Due to the concurrent input to the first sun gear 32 and the first annulus gear 34, the first planetary gear set 14 is caused to rotate clockwise as a unit at a third speed, which rotation is delivered to the drive sprocket 20 without any torque variation.

In the same manner as described above with regard to the second speed, the clockwise rotation of the drive sprocket 20 is transmitted to the third planetary carrier 54 with the aid of the endless chain 24 and the driven sprocket 22. As the third sun gear 48 is rigidly connected to the driven sprocket 22 by means of the fifth multi-disc clutch C5, the third carrier 54 cannot be subjected to any relative movement with respect to the third sun gear 48. This results in a unitary rotation of the third planetary gear set 18 as a whole, thus establishing the third forward drive ratio with no engine brake effect.

Fourth Forward Drive Ratio

The fourth forward drive ratio is fulfilled by way of further engaging the third drum-type brake B3 under the third speed condition and allowing the first oneway clutch F1 to wheel freely. The input from the input shaft 10 is delivered to the second planetary carrier 46 and to the first annulus gear 34. As the second sun gear 40 is kept immovable by means of the third brake B3, the second pinion gears 44 are subjected to a clockwise rotation thereby causing the second annulus gear 42 to rotate at a fourth speed.

This rotation of the second annulus gear 42 enables the drive sprocket 20 and, hence, the first planetary carrier 38 to rotate clockwise. As a consequence, the first sun gear 32 will be rotatably driven by the first pinion gears 36 at a much higher speed than that of the input shaft 10, making the first oneway clutch F1 free-wheelable and thereby the inputing the power delivery from the input shaft 10 to the first sun gear 32.

As in the third speed explained above, the clockwise rotation of the drive sprocket 20 is transmitted to the third planetary carrier 54 with the aid of the endless chain 24 and the driven sprocket 22. Due to the fact that the third sun gear 48 is rigidly connected to the driven sprocket 22 by means of the fifth multi-disc clutch C5, the third carrier 54 cannot be subjected to any relative movement with respect to the third sun gear 48. This results in a unitary rotation of the third planetary gear set 18 as a whole, thus providing the fourth forward drive ratio. As may be readily understood from the foregoing, each of the first to fourth forward drive ratios is determined by the first and the second planetary gear sets 14, 16 without resort to the third planetary gear set 18.

It should be appreciated that, in the foregoing fourth speed, the so-called engine brake or hill brake effect is obtainable. Specifically, in the event that a motor vehicle equipped with the present power train goes down a slope under a "coasting" state, for instance, the input from the vehicle wheels (not shown) may be reversely delivered to the engine through the third planetary gear set 18, the driven sprocket 22, the endless chain 24, the drive sprocket 20 and the first or second planetary gear set 16 in the stated sequence. Accordingly, such input speed of the vehicle wheels tends to be multiplied by virtue of the gear train so that the transmission input shaft is urged to rotate at an even higher speed than the engine crankshaft. However, since the engine is operating at a minimum RPM under the coasting state, the tendency of the transmission input shaft to rotate at the higher speed is automatically suppressed by the resistant "motoring torque" of the engine crankshaft, resulting in a rapid decrease in the vehicle wheel speed.

Fifth Forward Drive Ratio

The fifth forward drive ratio is provided by way of further engaging the fourth multi-disc brake B4 under the fourth speed condition, releasing the fifth multi-disc clutch C5 and allowing the fourth oneway clutch F4 to wheel freely in the fifth speed, the first and second planetary gear sets 14, 16 are adapted to act in the same fashion as set forth above in connection with the fourth speed.

The third planetary gear set 18 is however operable in a differing way. Namely, as the third sun gear 48 remains stationary by means of the fourth multi-disc brake B4, the third pinion gears 52 are caused to rotate around the third sun gear 48, with the result that the third annulus gear 50 should rotate at an increased speed. Accordingly, the third annulus gear 50 is enabled to produce the highest, fifth forward drive ratio. The engine brake effect is obtained under the fifth speed condition.

Reverse Drive Ratio

As marked in "R" in FIG. 2, the reverse drive ratio is produced by way of engaging the fourth multi-disc clutch C4, the fifth multi-disc clutch C5 and the first multi-disc brake B1, with the second and fourth oneway clutches F2, F4 brought into a locked state. The input from the input shaft 10 is delivered to the second sun gear 40 via the fourth multi-disc clutch C4. Since the second planetary carrier 46 is kept stationary by the cooperative action of the first brake B1 and the second oneway clutch F2, the clockwise rotation of the second sun gear 40 should be converted into a counterclockwise rotation of the second annulus gear 42 by means of the second pinion gears 44.

The counterclockwise rotation of the second annulus gear 42 is transmitted to the third planetary carrier 54 with the aid of the drive sprocket 20, the endless chain 24 and the driven sprocket 22. Due to the fact that the third sun gear 48 is rigidly connected to the driven sprocket 22 by means of the fifth multi-disc clutch C5, the third carrier 54 cannot be subjected to any relative movement with respect to the third sun gear 48. This results in a unitary counterclockwise rotation of the third planetary gear set 18 as a whole, thus providing the reverse drive ratio.

While the present invention has been shown and described with reference to the particular embodiments, it will be apparent to those skilled in the art that many changes and modifications may be made without departing from the spirit and scope of the invention as defined in the appended claims.

What is claimed is:

1. An automatic transmission for a motor vehicle having a gear train capable of providing five forward drive and one reverse drive ratios, said gear train comprising:

(a) an input shaft;

(b) a first planetary gear set concentrically mounted about said input shaft for rotary movement therewith, said first planetary gear set including a first sun gear selectively connectable to said input shaft, a first annulus gear, a plurality of first pinion gears circumferentially disposed between said sun gear and said annulus gear and a first planetary carrier rotatably supporting said first pinion gears;

(c) a second planetary gear set concentrically mounted about said input shaft in an axially spaced relationship with respect to said first planetary gear set, said second planetary gear set including a second sun gear selectively connectable to said input shaft, a second annulus gear rigidly coupled to said first planetary carrier for unitary rotation therewith, a plurality of second pinion gears circumferentially disposed between said second sun gear and said second annulus gear and a second planetary carrier rotatably supporting said second pinion gears, said second planetary carrier rigidly connected to said first annulus gear and selectively couplable to said input shaft, wherein said first and second planetary gear sets are interrelated one another to produce the first to the fourth forward drive ratios and the reverse drive ratio one at a time;

(d) an output shaft extending in a spaced, parallel relationship with respect to said input shaft; and (e) a third planetary gear set concentrically mounted about said output shaft, said third planetary gear set including a third sun gear selectively connectable to both of said first planetary carrier and said second annulus gear, a third annulus gear coaxially disposed around the third sun gear, a plurality of third pinion gears circumferentially disposed between said third sun gear and said third annulus gear and a third planetary carrier rotatably supporting said third pinion gears, said third planetary carrier drivingly coupled to both of said first planetary carrier and said second annulus gear, wherein said third planetary gear set is operable to produce the fifth forward drive ratio.

2. The automatic transmission as recited in claim 1, further comprising means for delivering a rotary force from said first and second planetary gear sets to said third planetary gear set.

3. The automatic transmission as recited in claim 2, wherein said delivering means includes a drive sprocket rigidly connected to said first planetary carrier and said second annulus gear for rotation therewith, a driven sprocket rigidly connected to said third planetary carrier for rotation with said output shaft and an endless chain drivingly connecting said drive sprocket to said driven sprocket.

4. The automatic transmission as recited in claim 1, further comprising:

a transmission casing;

a first clutch means selectively engageable for connecting said input shaft to said first sun gear;

a second clutch means selectively engageable for connecting said input shaft to said first sun gear in such a manner as to disconnect reverse power delivery therebetween;

a third clutch means selectively engageable for connecting said input shaft to both of said first annulus gear and said second planetary carrier;

a fourth clutch means selectively engageable for connecting said input shaft to said second sun gear;

a fifth clutch means selectively engageable for causing said third sun gear to rotate in unison with said third planetary carrier;

a first brake means fixedly secured to said transmission casing and selectively engageable for holding immovable said second planetary carrier and said first annulus gear;

a second brake means fixedly secured to said transmission casing and selectively engageable for holding immovable said second sun gear in one direction;

a third brake means fixedly secured to said transmission casing and selectively engageable for holding immovable said second sun gear in any direction; and a fourth brake means fixedly secured to said transmission casing and selectively engageable for holding immovable said third sun gear in any direction.

5. The automatic transmission as recited in claim 4, wherein said second clutch means includes a second, hydraulically actuated disc clutch and a first oneway clutch arranged in a serial connection with respect to said second disc clutch for allowing power delivery from said input shaft to said first sun gear.

6. The automatic transmission as recited in claim 5, wherein said first brake means includes a first, hydraulically actuated disc brake and a second oneway clutch arranged in a parallel relationship with respect to said first disc brake for normally preventing said second planetary carrier from rotation in one direction.

7. The automatic transmission as rected in claim 6, wherein said second brake means includes a second, hydraulically actuated disc brake and a third oneway clutch arranged in a serial connection with respect to said second disc brake for preventing said second planetary carrier from rotation in one direction.

8. The automatic transmission as recited in claim 7, wherein said fifth clutch means includes a fifth, hydraulically actuated disc clutch and a fourth oneway clutch arranged in a parallel connection with respect to said fifth disc clutch for preventing said third sun gear from rotation relative to said third planetary carrier in one direction.

9. The automatic transmission as recited in claim 8, wherein said first clutch means includes a first, hydraulically actuated disc clutch, said third clutch means comprising a third, hydraulically actuated disc clutch, said fourth clutch means including a third hydraulically actuated band brake, said fourth brake means including a fourth, hydraulically actuated disc brake.

10. The automatic transmission as recited in claim 1, further comprising a final reduction gear arrangement for further reducing rotational speed of said third annulus gear.

11. The automatic transmission as recited in claim 10, wherein said final reduction gear arrangement includes a fourth simple planetary gear set concentrically mounted about said output shaft in an axially spaced relationship to said third planetary gear set.

12. The automatic transmission as recited in claim 9, wherein:

(a) said first forward drive ratio is established by bringing each of said second and fifth disc clutches into engagement and allowing said first, second and fourth oneway clutches to be locked against rotation;

(b) said second forward drive ratio is established by bringing each of said second disc clutch, said fifth disc clutch and said second disc brake into engagement and allowing said first, third and fourth oneway clutches to be locked against rotation;

(c) said third forward drive ratio is established by bringing each of said second disc clutch, said third disc clutch, said fifth disc clutch and said second disc brake into engagement and allowing said first and fifth oneway clutches to be locked against rotation;

(d) said fourth forward drive ratio is established by bringing each of said second disc clutch, said third disc clutch, said fifth disc clutch, said second disc brake and said third band brake into engagement and allowing said fourth oneway clutch to be locked against rotation;

(e) said fifth forward drive ratio is established by bringing each of said second disc clutch, said third disc clutch, said second disc brake, said third band brake and said fourth disc brake into engagement and allowing said first to fourth oneway clutches to rotate freely; and (f) said reverse drive ratio is established by bringing each of said fourth disc clutch, said fifth disc clutch and said first disc brake into engagement and allowing said second and fourth oneway clutches to be locked against rotation.

* * * * *

UNITED STATES PATENT AND TRADEMARK OFFICE
CERTIFICATE OF CORRECTION

PATENT NO. : 5,743,824
DATED : April 28, 1998
INVENTOR(S) : Lae-Kyoung Park

It is certified that error appears in the above-identified patent and that said Letters Patent is hereby corrected as shown below:

On the title page item [57],

In the Abstract:
    Line 13, "chive" should read --drive--;

Col. 9, Claim 4, line 16, change "ther-" to --there --;
                  line 17, change "ebetween;" to --between--;

Col. 9, Claim 7, line 52, change "rected" to --recited--.

Signed and Sealed this

Seventeenth Day of August, 1999

Attest:

Q. TODD DICKINSON

*Attesting Officer*        *Acting Commissioner of Patents and Trademarks*